July 30, 1968 R. J. KNOX 3,394,426
HONEY HIVE AND COMB FRAME CLEANING APPARATUS
Filed Feb. 16, 1967 2 Sheets-Sheet 1
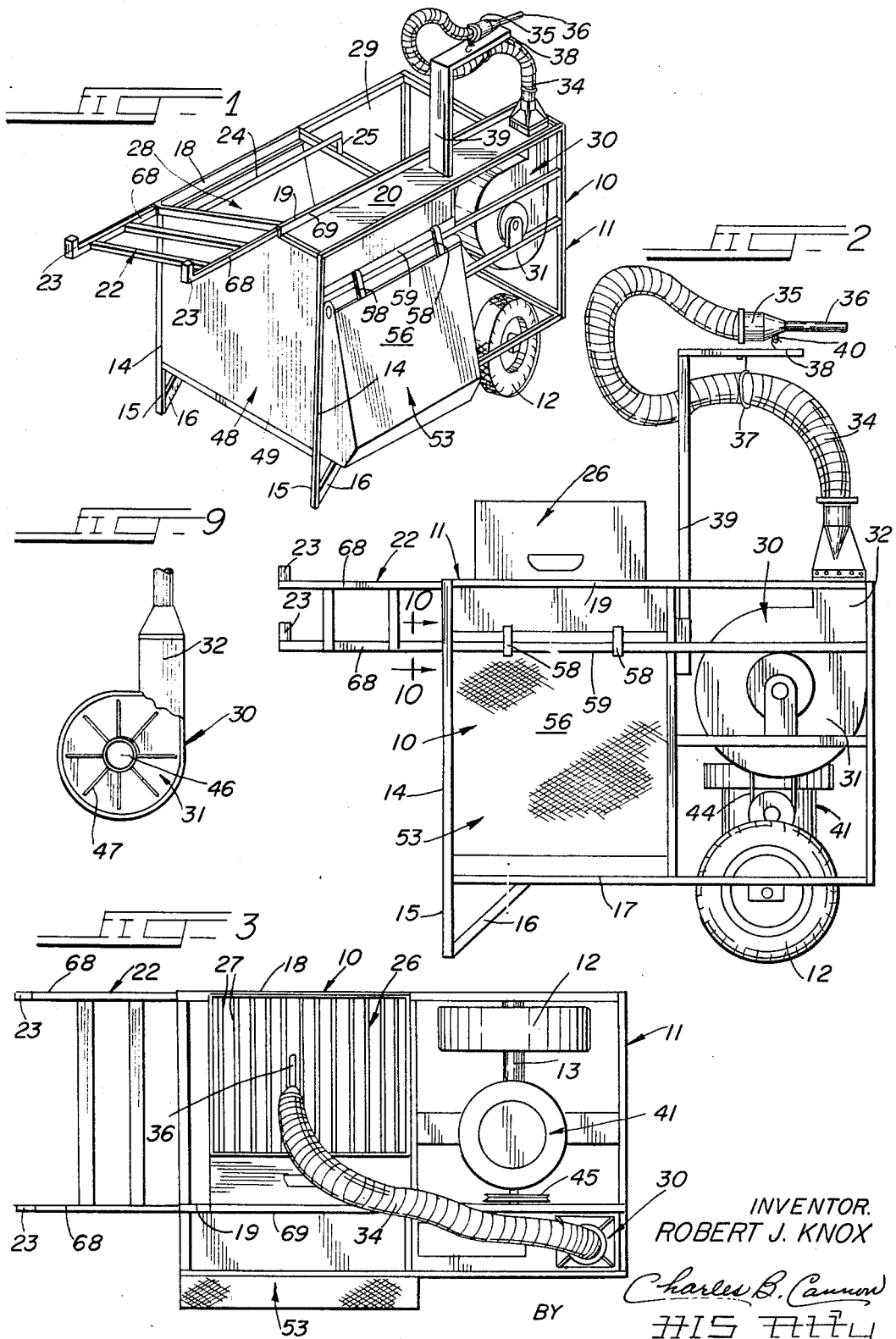
INVENTOR.
ROBERT J. KNOX
Charles B. Cannon
BY
HIS ATTY.

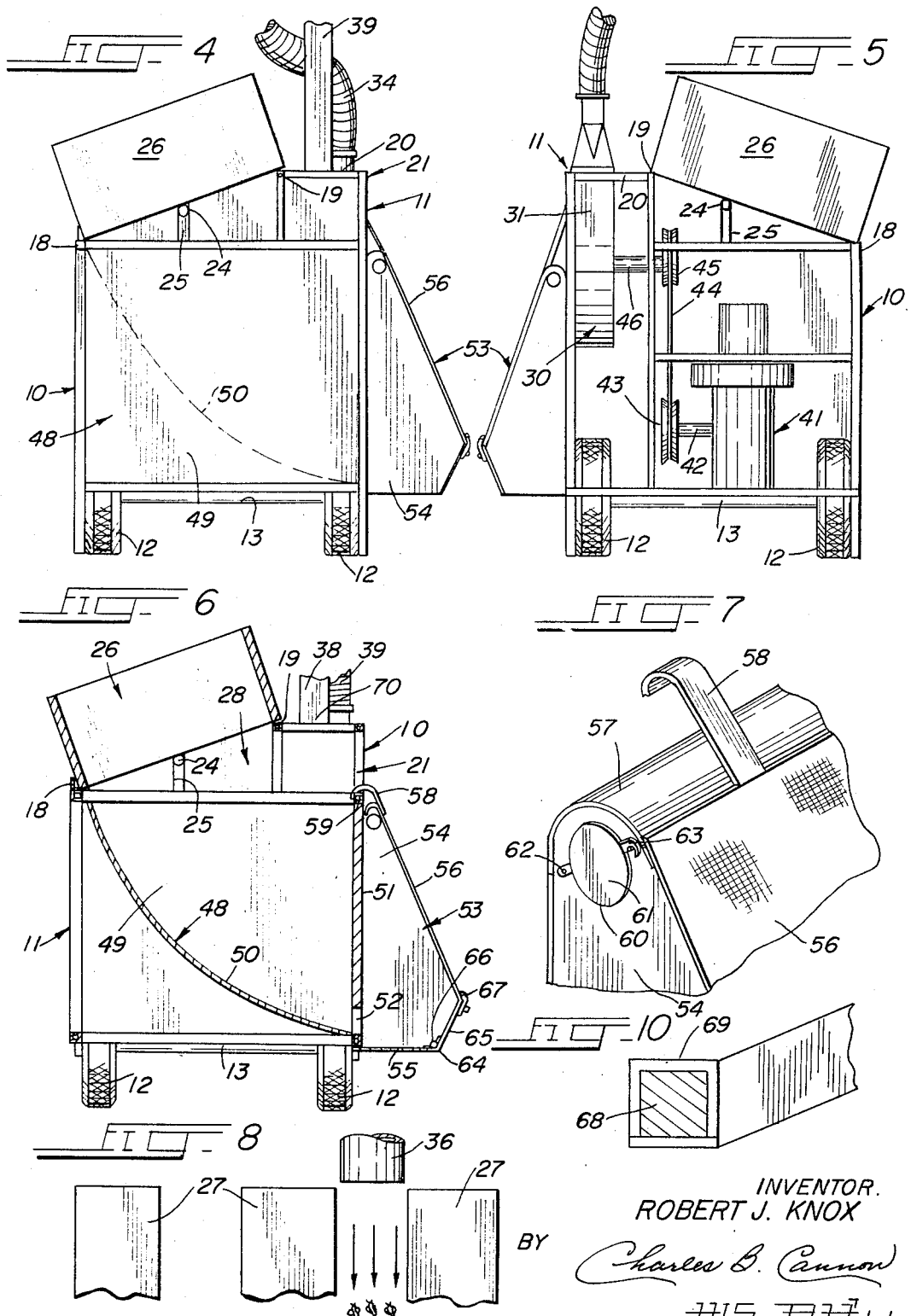

United States Patent Office 3,394,426
Patented July 30, 1968

3,394,426
HONEY HIVE AND COMB FRAME
CLEANING APPARATUS
Robert J. Knox, Rte. 2, Neenah, Wis. 54956
Filed Feb. 16, 1967, Ser. No. 616,581
14 Claims. (Cl. 15—304)

ABSTRACT OF THE DISCLOSURE

This invention relates to a portable honey bee hive box and comb frame cleaning apparatus and, more particularly, to an apparatus for removing bees from so-called supers or honey hive boxes and comb frames therefor employing a high velocity air stream. The invention embodies an air blower apparatus for cleaning bees from hive boxes or supers and comb frames and embodies a manually portable frame including a power driven air blower unit and flexible hose and nozzle for directing a stream of high velocity air into a hive box or super and between comb frames therein for removing bees therefrom. The invention also includes means for supporting a hive box and comb frames at the top of the apparatus and means for collecting the bees as they are driven from the hive box and comb frames.

Description

Heretofore in the art of honey hive and comb frame cleaning apparatus, it has been customary after the honey has been removed from the hive box or super and comb frames to remove the remaining bees in various ways. One of such ways has been to place over the super or hive box a sheet of metal having a sheet of absorbent felt or like absorbent fabric on the inner surface thereof; saturating the absorbent sheet with phenol or like chemical; and then exposing the assembly to the sun with the metal sheet uppermost so that the heat from the sun would be absorbed by the metal sheet which, in turn, would heat the underlying absorbent sheet and thus evaporate the phenol in the absorbent sheet below the metal surface with the result that the thus gasified or vaporized phenol would drive the bees out of the supers or hive box and the comb frames therein. However, this practice is dangerous and unhealthful to the workmen and injurious to the bees.

Another method which has been employed heretofore for removing residual bees from supers or hive boxes and comb frames therefor has been to treat a layer of absorbent felt or like fabric on the bottom surface of a metal sheet, as referred to above, with various chemicals such as propionic acidanhydride, benzaldehyde, and the like, and certain of such chemical materials have been used with absorbent pressed board materials, such as insulation boards, and the like. However, all of the prior art practices referred to above have been objectionable, in one way or another, and particularly in that they have involved the use of chemical materials which may be dangerous to the health of the workmen as well as injurious to the bees.

Accordingly, an object of the present invention is to provide a new and improved apparatus for cleaning supers or hive boxes and comb frames therefor of bees prior to the time the supers or hive boxes and the comb frames therefor are removed to the honey extracting apparatus for extraction of the honey therefrom.

An additional object of the invention is to provide a new and improved air blower apparatus for effectively removing bees and debris from supers or hive boxes and comb frames therefor without injuring the bees and without endangering the health of the workman.

A further object of the invention is to provide a new and improved air blower apparatus for removing bees from honey supers or hive boxes and comb frames therefor in such a manner that the bees may be readily collected without injury to them as they are removed from the supers or hive boxes and comb frames in a single and expeditious manner.

An additional object of the invention is to provide a new and improved apparatus for cleaning bees from supers or hive boxes and comb frames prior to the honey extracting operation and which apparatus includes a novel supporting frame for supporting a super or hive box and comb frames therein prior to, during and after the operation of cleaning the super or hive box and comb frames therein of residual bees.

Other objects will appear hereinafter.

FIG. 1 is a perspective view of a honey hive and comb frame cleaning apparatus embodying the present invention;

FIG. 2 is a side elevational view of the new honey hive and comb frame cleaning apparatus shown in FIG. 1;

FIG. 3 is a top plan view thereof;

FIG. 4 is a fragmentary end elevational view as seen from the left hand in FIG. 2;

FIG. 5 is a fragmentary end elevational view as seen from the right hand in FIG. 2;

FIG. 6 is a transverse vertical sectional view on line 6—6 in FIG. 2;

FIG. 7 is a fragmentary perspective view of a collecting basket unit for collecting the bees as they are removed from the super or hive box and comb frames;

FIG. 8 is a fragmentary schematic view illustrating the manner in which the bees are removed from the super or hive box and comb frames in the use of the present invention;

FIG. 9 is a fragmentary detail view of the air blower embodied in the new apparatus; and FIG. 10 is a sectional detail view of a part of the invention.

A preferred embodiment of the new honey hive box and comb frame cleaning apparatus is illustrated in the drawings wherein it is generally indicated at 10, and comprises a manually operable generally rectangular-shaped metal cart frame 11 which is supported at one end on wheels 12 which are mounted on an axle 13 which is suitably journaled in the supporting frame 11.

At its other end the supporting frame 11 includes vertically extending corner frame members 14 the lower end portions of which terminate in depending supporting feet 15 which are suitably braced by brace members 16 which extend between the depending supporting feet 15 and the horizontally extending bottom frame members 17 of the supporting frame 11.

The supporting frame 11 also includes an upper horizontally extending rail member 18 and a supporting rail member 19 which extends parallel to the rail member 18 above the latter. The upper supporting rail member 19 is formed as a part of the top wall 20 of a horizontal shelf unit 21 which is supported on the supporting frame 11 at one side thereof. A combination handle unit and super or hive box supporting extension unit 22 is provided at one end of the supporting frame 11 and projects laterally therefrom, at an acute angle to the horizontal, and is preferably detachably mounted in any suitable manner on the supporting frame 11, for reasons which will be pointed out hereinafter. The extension unit 22 has upstanding stop portions 23 at the outer end thereof.

A supporting rod member 24 extends across the supporting frame 11 at the top thereof, intermediate the supporting rails 18 and 19, and this intermediate supporting rod member is supported by upright supporting posts 25 which are carried by the supporting frame 11. In the use of the invention a so-called super or hive box or body 26 with a plurality of individual honey comb frame members 27 (FIGS. 3 and 8), may be removably mounted in an inclined position on the lower and upper supporting rail members 18 and 19, respectively, and on the intermediate supporting rod member 24.

In use, one of the supers or hive boxes or bodies 26 and included honey comb frame members 27 may be placed at the first station on the extension unit 22 and then slid therefrom along the supporting rails 18–19 and supporting rail 24 into the working area or station 28 of the apparatus from which each cleaned super or hive box 26 and included frames 27 may be moved into the work area or station 29 from which it may be removed for extraction of the honey.

The new super or hive box or body and comb frame cleaning apparatus 10 includes air blower means for blowing residual bees out of a super or hive box or body 26 and the comb frames 27 therein and for collecting the bees as they are driven therefrom.

To this end the new super or hive box or body and comb frame cleaning apparatus includes an air blower unit 30 which is mounted in and is carried by the supporting frame 11 and embodies a housing 31 having an upper and outer end portion 32 which, in turn, has a venturi throat portion 33 at its upper end to which is connected a flexible rubber or like air hose 34. The flexible rubber or like air hose 34 has a discharge nozzle 35 attached thereto at its outer end and this nozzle 35 has an outlet portion 26 of reduced diameter relative to the body of the nozzle 35. The flexible air hose 34 projects through and is suspended from a cradle ring 37 which is attached to the horizontal arm 38 of an upright supporting post member 39 which is carried by the supporting frame 11 and projects above the latter. A hook and eye arrangement 40 are provided for detachably attaching the nozzle 35–36 to the horizontal arm 38 of the supporting post 39.

The air blower unit 30 may be operated by any suitable power unit or source, which may be mounted in the supporting frame 11, such as a gasoline motor unit 41 and suitable power transmission means which includes a drive shaft 42 which extends from the motor unit 41, a centrifigual clutch 43 carried by the drive shaft 42, a belt 44 which is operatively connected to the centrifugal clutch 43 and to a pulley 45 which is mounted on the supporting shaft 46 of the blower unit 30 (FIG. 5). The blower unit 30 includes a vane-shaped blowing fan member 47 which is carried by the blower shaft 46 (FIG. 9) and it has been found in the use of the present invention that the blower fan member 47 should operate at a speed of about 5000 r.p.m. and that the gasoline motor unit 41 should be about 5 H.P. to provide sufficient force in the air stream in the flexible hose 34 to dislodge the bees from the supers or hive boxes 26 and the frames 27, since bees cling tenaciously to such parts.

The new super or hive box or body and comb frame cleaning apparatus 10 also embodies means for collecting the bees as they are driven from the super or honey hive box or body 26 and comb frames 27 and a preferred form of such means includes a chute 48 which is suitably mounted in and is carried by the supporting frame 11 below the supporting members 18–19–24 (FIG. 6) and below the working area 28 of the supporting frame 11. The chute 48 includes side walls 49, a convexly downwardly curved bottom wall 50 and a front wall 51.

The chute 48 also includes a front wall 51 which has a discharge or outlet opening 52 at its lower end, it being noted that the inclined bottom wall 50 of the chute 48 extends transversely across the supporting frame 11 below the open top portion and working area 28 thereof (FIGS. 1 and 6).

The means for collecting the bees as they are driven from the super or hive box 26 and comb frames 27 disposed on the support members 18–19–24 in the working area 28 also includes a portable bee-collecting basket unit 53 which is detachably mounted on the supporting frame 11 and includes side walls 54, a bottom wall 55, a screen front wall 56, and a convexly upwardly curved top wall 57 to which hook-shaped supporting or hanger members 58 are attached for detachably attaching the bee-collecting basket unit 53 to a horizontally extending supporting rail portion 59 of the supporting frame 11. A discharge outlet opening 60 is provided in one end wall 54 of the bee-collecting basket unit 53 and this discharge outlet opening 60 is normally closed by a pivoted damper-like door or gate 61 which is pivotally mounted as at 62, on the adjacent end wall 54 of the bee-collecting basket unit 53 to which the pivoted gate or door 61 may be detachably latched by suitable latch means such as the hook and eye latch unit 63 (FIG. 7).

An opening 64 is provided in the lower front end portion of the bee-collecting basket unit 53 and this door opening 64 is normally closed by a door 65 which is hingedly mounted at its lower end, as at 66, to the front end portion of the bottom wall 55 of the bee-collecting basket unit 53, and the door 65 is detachably latched at its upper end, as at 47, to the lower front end portion of the front screen wall 56 of the bee-collecting basket unit 53 (FIG. 6).

Each of the upper and lower supporting rails 19 and 18, respectively, preferably includes a channel-shaped portion as 69 (FIG. 9) in which the corresponding one of the top and bottom rails 68 of the inclined extension unit 22 is slidably mounted.

*Operation*

The use and operation of the new honey super or hive box and comb frame cleaning apparatus 10 are as follows:

The flexible air hose 34 is normally disposed, as shown in FIG. 2, supported in the cradle ring arm 37 of the horizontal arm 38 of the upright supporting post 39, with the nozzle 35–36 held by the hook and eye latch 40 so that the entire apparatus 10 may be manually moved from place to place by manually grasping the combination handle and extension frame unit 22 and lifting the supporting feed 15 off their supporting surface and manually propelling the entire apparatus 10 from place to place on its supporting wheels 12. Thus, the new super or honey hive box and comb frame cleaning apparatus 10 may be used in and around apiaries, in honey extracting and processing plants, and the like.

A honey hive box or super 26 with the comb frames 27 therein may first be mounted on the extension unit 22 at the front end of the apparatus 10 wherein it will be disposed in an inclined position on the supporting rails 68 of the extension unit 22 from which it may be manually slid onto the supporting rails 18–19 and supporting rod 24 into position in the working area 28 of the supporting frame 11 and above the chute 48, with the super or hive box 26 and the comb frames 27 thus disposed at an acute angle relative to the horizontal to facilitate ready visual examination of the interior of each super or hive box 26 and the comb frames 27 therein and also to facilitate the insertion of the air hose nozzle 36 into each super or hive box 26 and between the comb frames 27 therein, as shown in FIG. 3. It will be understood, in this connection, that the top and bottom walls of the super or hive box 26 which is to be cleaned of bees are at this time open. The air hose 34 and attached nozzle 35–36 are then unlatched from the hook and eye latch means 40 and the air blower unit 30 is then activated by means of the motor unit 41 which delivers power from the motor unit 41 by way of the shaft 42, centrifugal clutch 43, belt 44 and pulley 45 to the shaft 46 of the air blower unit 30 which then rotates the vane-shaped blower fan which is thus rotated to deliver a high velocity stream of air from the blower housing 31 and its upper venturi throat portion 32 into the flexible air hose 34 and its discharge nozzle 35–36.

The nozzle 36 of the flexible air hose 34 is then inserted into the super or hive box 26 through the open top thereof, and between the honey comb frames 27, and thus directs a stream of high velocity air into the super or hive box 26 and between the comb frames 27 so as to dislodge the bees therefrom and discharge them downwardly out of the super or hive box 26 and from the comb frames 27 into the chute 48 and onto the inclined bottom wall 50 thereof from which the bees are blown by the air stream through the outlet opening 52 in the front wall 51 of the chute 48 into the bee-collecting basket unit 53 where they will accumulate on the bottom wall 55 and adjacent parts of the bee-collecting basket unit 53.

As each super or hive box 26 and the comb frames 27 are thus cleaned, it may be slid along the supporting rails 18–19 and supporting rod 24 into the area 29 of the supporting frame 11 from which it may be removed for extraction of the honey from the super or hive box 26 and comb frames 27.

If and when it is desired to remove the bees from the bee-collecting basket unit 53, this may be accomplished by lifting the bee-collecting basket unit 53 on its supporting hook of hanger members 58 off the supporting rail 59, and tilting the bee-collecting basket unit 53 so that the convexly curved upper wall 57 thereof is disposed at the then bottom of the bee-collecting basket unit 53. During this operation, the bees will fall into the trough-like unit thus formed by the then inverted convexly upwardly curved upper wall 57 from which they may be discharged through the discharge outlet or port 60 into a new super or hive box or other receptacle. To this end the normally latched and closed gate or door 61 may be unlatched at 63 and pivoted at 62 into position to open the outlet or port 60.

If and when it is desired to gain access to the bee-collecting basket unit 53 while it is still in position of use suspended from the supporting rail 59, as for example for removing a queen bee, this may be readily accomplished by unlatching the door 65 at 67 and hingedly moving the door 65 on its hinge 66 into open position, which is thus accomplished without removing the bee-collecting basket unit 53 from its normal position of use on the supporting frame 11, as shown.

When it is desired to transport the new apparatus 10 from place to place, in an automotive truck, or the like, or to store it, the lateral extension unit 22 may be detached from the body of the supporting frame 11 by sliding the top and bottom rails 68 thereof out of the channel-shaped guideway portions 69 of the top and bottom supporting rails 19 and 18 (FIGS. 1 and 10).

The new portable honey hive box and comb frame cleaning apparatus thus enables a beekeeper or honey processor to clean hive boxes or supers and comb frames of residual bees without the use of any dangerous or unhealthy chemicals and in an expeditious manner and without injury to the bees since it is found that the bees are not injured by the high velocity air stream to which they are subjected in removing them from the supers or hive boxes 26 and comb frames 27 and discharging them into the chute 48 and thence into the bee-collecting basket unit 53. At the same time, the new apparatus has the advantage of enabling a queen bee to be removed from the bee-collecting basket unit 53 without injury, as and when desired.

It will thus be seen from the foregoing description, considered in conjunction with the accompanying drawings, that the present invention provides a new and improved portable apparatus for air cleaning honey supers or hive boxes and comb frames of bees and hence has the desirable advantages and characteristics and accomplishes its intended objects including those hereinbefore pointed out and others which are inherent in the invention.

I claim:

1. An apparatus for cleaning bee hive boxes and comb frames disposed therein comprising:
    (a) a portable supporting frame structure having mounted thereon
        (1) means for supporting a hive box and comb frames therein;
        (2) bee-receiving means disposed below the said supporting means for receiving bees from a hive box and comb frames therein disposed on the said supporting means;
        (3) air blower means including:
            (a) a flexible air hose having an outer end portion having attached thereto
                (1) an air discharge nozzle for directing a stream of high velocity air into the said hive box and at comb frames therein to discharge bees therefrom into the said bee-receiving means; and
        (4) power means for operating the said air blower means.

2. An apparatus as defined in claim 1 in which the said bee-receiving means is in the form of
    (a) an inclined chute disposed in the said supporting means for receiving bees from the said hive box and comb frames and for discharging the bees to a point externally of the said supporting frame; and in which the said apparatus includes
    (b) a bee-collecting basket unit removably mounted on the said supporting frame and having communication with and for receiving bees from the said inclined chute; and
    (c) means for mounting the said bee-collecting basket unit on the said supporting frame.

3. An apparatus as defined in claim 2 which includes:
    (a) means for detachably mounting the said bee-collecting basket unit on the said supporting frame.

4. An apparatus for cleaning bee hive boxes or supers and comb frames therein of bees as defined in claim 2 in which the said supporting frame has
    (a) an open upper portion providing an open upper end and work station above the said inclined chute; and in which the said supporting frame has
    (b) horizontally extending supporting members thereon for supporting a super or hive box and comb frames therein at the said work station on the said open upper end portion of the said supporting frame and above the said open upper end of the said chute.

5. An apparatus for cleaning bee hive boxes or supers and comb frames therein of bees, as defined in claim 4, in which the said horizontally extending supporting members and the said supporting frame provides a third station for supporting a bee hive box or super and comb frames after they have been cleaned of bees.

6. An apparatus for cleaning bee hive boxes or supers of bees as defined in claim 4 in which the said supporting means has
    (a) a lateral horizontally disposed extension at one end thereof for supporting a super or hive box and comb frames therein prior to the cleaning operation; and in which
    (b) the said lateral horizontally disposed extension of the said supporting frame also provides a handle unit for manually propelling the said apparatus from place to place.

7. An apparatus for cleaning bee hive boxes or supers and comb frames therein of bees as defined in claim 2 in which the said supporting frame has
    (a) an open upper portion providing an open upper end for the said inclined chute; and in which the said supporting frame has
    (b) horizontally extending members thereon for supporting a super or hive box and comb frames therein on the said open upper portion of the said supporting frame and at an acute angle relative to the horizontal and above the said open upper end of the said chute.

8. An apparatus as defined in claim 1 in which the said bee-receiving means is in the form of
   (a) an inclined chute disposed in the said supporting means for receiving bees from the said hive box and comb frames and for discharging the bees to a point externally of the said supporting frame.

9. An apparatus as defined in claim 1 in which the said bee-receiving means is in the form of
   (a) an inclined chute disposed in the said supporting means for receiving bees from the said hive box and comb frames and for discharging the bees to a point externally of the said supporting frame; and in which the said apparatus includes
   (b) a bee-collecting basket unit removably mounted on the said supporting frame and having communication with and for receiving bees from the said inclined chute; and
   (c) means for mounting the said bee-collecting basket unit on the said supporting frame; and in which the said bee-collecting basket unit includes:
      (1) a convexly upwardly curved upper wall;
      (2) side walls at least one of which has a discharge outlet opening formed therein at one end thereof and adjacent to the said convexly upwardly curved top wall of the said bee-collecting basket
   whereby the said bee-collecting basket may be detached from the said supporting frame and inverted so that the said convexly upwardly curved top wall thereof provides in its inverted position a trough-shaped receptacle for the bees at the then bottom of the bee-collecting basket and from which the bees may be poured through the said discharge outlet opening.

10. An apparatus as defined in claim 1 in which the said bee-receiving means is in the form of
    (a) an inclined chute disposed in the said supporting means for receiving bees from the said hive box and comb frames and for discharging the bees to a point externally of the said supporting frame; and in which the said apparatus includes
    (b) a bee-collecting basket unit removably mounted on the said supporting frame and having communication with and for receiving bees from the said inclined chute; and
    (c) means for mounting the said bee-collecting basket unit on the said supporting frame; and in which the said bee-collecting basket unit includes
       (1) a convexly upwardly curved upper wall;
       (2) side walls at least one of which has a discharge outlet opening formed therein at one end of and adjacent to the said convexly upwardly curved top wall of the said bee-collecting basket
    whereby the said bee-collecting basket may be detached from the said supporting frame and inverted so that the said convexly upwardly curved top wall thereof provides in its inverted position a trough-shaped receptacle for the bees at the then bottom of the bee-collecting basket and from which the bees may be poured through the said discharge outlet opening; and in which the said bee-collecting basket includes:
       (3) a bottom wall having:
          (a) an opening therein; and
       (4) a door hingedly mounted on the said bee-collecting basket unit for closing the said door.

11. An apparatus as defined in claim 1 which includes:
    (a) rotatable supporting wheels carried by the said supporting frame adjacent one end thereof; and
    (b) vertically extending supporting feet carried by and depending below the said supporting frame adjacent the other end thereof.

12. An apparatus as defined in claim 1 which includes:
    (a) rotatable supporting wheels carried by the said supporting frame adjacent one end thereof; and
    (b) vertically extending supporting feet carried by and depending from the said supporting frame adjacent the other end thereof; and in which the said supporting frame has
    (c) a combination hive box-supporting and handle extension projecting horizontally therefrom at the end thereof at which the said depending supporting feet are disposed and above the latter.

13. An apparatus as defined in claim 1 which includes:
    (a) vertically extending supporting means carried by the said supporting frame and projecting above the latter for supporting the said flexible air hose when the said flexible air hose is not in use.

14. An apparatus for cleaning bee hive boxes or supers of bees as defined in claim 1 in which the said supporting means has
    (a) a lateral horizontally disposed extension at one end thereof for supporting a super or hive box and comb frames therein prior to the cleaning operation; and in which
    (b) the said lateral horizontally disposed extension of the said supporting frame also provides a handle unit for manually propelling the said apparatus from place to place; and in which the said lateral horizontally disposed extension of the said supporting frame is
       (1) detachably mounted on the said supporting frame so that it may be removed therefrom as and when desired.

References Cited

UNITED STATES PATENTS 251,574  12/1881  Graves _____ 15—303 X

FOREIGN PATENTS 8,397  4/1906  Great Britain.

ROBERT W. MICHELL, *Primary Examiner.*